US011536935B2

(12) United States Patent
Mochizuki

(10) Patent No.: US 11,536,935 B2
(45) Date of Patent: Dec. 27, 2022

(54) LENS SYSTEM AND IMAGE PICKUP APPARATUS

(71) Applicant: NITTOH INC., Suwa (JP)

(72) Inventor: Keiichi Mochizuki, Suwa (JP)

(73) Assignee: NITTOH INC., Suwa (JP)

( * ) Notice: Subject to any disclaimer, the term of this patent is extended or adjusted under 35 U.S.C. 154(b) by 299 days.

(21) Appl. No.: 16/956,207

(22) PCT Filed: Dec. 26, 2018

(86) PCT No.: PCT/JP2018/047817
§ 371 (c)(1),
(2) Date: Jun. 19, 2020

(87) PCT Pub. No.: WO2019/131749
PCT Pub. Date: Apr. 7, 2019

(65) Prior Publication Data
US 2020/0341250 A1  Oct. 29, 2020

(30) Foreign Application Priority Data

Dec. 28, 2017 (JP) .............................. JP2017-253612
Dec. 28, 2017 (JP) .............................. JP2017-253613

(51) Int. Cl.
*G02B 15/177* (2006.01)
*G02B 13/02* (2006.01)
*G02B 27/00* (2006.01)

(52) U.S. Cl.
CPC .......... *G02B 15/177* (2013.01); *G02B 13/02* (2013.01); *G02B 27/0025* (2013.01)

(58) Field of Classification Search
CPC ... G02B 27/0025; G02B 13/02; G02B 15/177
(Continued)

(56) References Cited

U.S. PATENT DOCUMENTS 7,583,448 B2 * 9/2009 Minakata ........... G02B 13/0045
359/686
2010/0053764 A1 3/2010 Amano
(Continued)

FOREIGN PATENT DOCUMENTS

JP 2001-228391 A 8/2001
JP 2004325699 A * 11/2004 ........... G02B 15/177
(Continued)

OTHER PUBLICATIONS

PCT, Japanese Patent Office (ISA/JP), International Preliminary Report on Patentability and Written Opinion (with English translation), International Application No. PCT/JP2018/047817, 8 pages (dated Jun. 30, 2020).
(Continued)

*Primary Examiner* — James R Greece
(74) *Attorney, Agent, or Firm* — Thompson Hine LLP

(57) ABSTRACT

A lens system (10) for image pickup includes, in order from an object side (11), a first lens group (G1) that has negative refractive power and is fixed during focusing, a second lens group (G2) that has positive refractive power and moves during focusing, a third lens group (G3) that has positive refractive power and is fixed during focusing, and a fourth lens group (G4) that has a stop disposed on the object side, is disposed closest to an image plane side, has positive refractive power, and is fixed during focusing. The first lens group includes a first lens (L11) with positive refractive power that is disposed closest to the object side.

20 Claims, 14 Drawing Sheets

(58) Field of Classification Search
USPC .................................. 359/684, 686, 676
See application file for complete search history.

(56) References Cited

U.S. PATENT DOCUMENTS

| | | | |
|---|---|---|---|
| 2010/0290133 | A1 | 11/2010 | Sano et al. |
| 2011/0002046 | A1 | 1/2011 | Wada et al. |
| 2011/0032606 | A1 | 2/2011 | Imaoka |
| 2011/0102906 | A1* | 5/2011 | Oe ................ G02B 15/144113 359/684 |
| 2011/0304921 | A1 | 12/2011 | Nagahara |
| 2017/0168274 | A1* | 6/2017 | Inoue ................... G02B 15/177 |

FOREIGN PATENT DOCUMENTS

| | | | | | |
|---|---|---|---|---|---|
| JP | 2006-162700 | A | | 6/2006 | |
| JP | 2006162700 | A | * | 6/2006 | |
| JP | 2007140474 | A | * | 6/2007 | ........... G02B 15/177 |
| JP | 2007248840 | A | * | 9/2007 | ............. G02B 13/22 |
| JP | 2010-266577 | A | | 11/2010 | |
| JP | 2010271558 | A | * | 12/2010 | |
| JP | 2011-013469 | A | | 1/2011 | |
| JP | 2011-053663 | A | | 3/2011 | |
| JP | 2011123351 | A | * | 6/2011 | |
| JP | 2012-022310 | A | | 2/2012 | |
| JP | 2015-022220 | A | | 2/2015 | |
| JP | 2016184136 | A | * | 10/2016 | |

OTHER PUBLICATIONS

PCT, Japanese Patent Office (ISA/JP), International Search Report, International Application No. PCT/JP2018/047817, 4 pages (dated Mar. 19, 2019).

* cited by examiner

Fig. 2

| LENS SURFACE NUMBER (S) | RADIUS OF CURVATURE (Ri) | DISTANCE (di) | REFRACTIVE INDEX (nd) | ABBE NUMBER (νd) | EFFECTIVE DIAMETER (Di) | LENS | | FOCAL LENGTH (mm) |
|---|---|---|---|---|---|---|---|---|
| 1 | 115.495 | 7.84 | 1.85025 | 30.05 | 70.5 | L11* | | G1a |
| 2 | 4082.497 | 0.30 | | | 68.8 | | | −137.05 |
| 3 | 98.124 | 1.40 | 1.49700 | 81.55 | 61.2 | L12* | | |
| 4 | 43.105 | 10.91 | | | 54.2 | | | |
| 5 | −366.637 | 1.40 | 1.49700 | 81.55 | 53.8 | L13* | | |
| 6 | 66.495 | 26.30 | | | 49.8 | | | |
| 7 | −55.393 | 1.30 | 1.59270 | 35.31 | 42.3 | L14* | B11 | G1b |
| 8 | 122.653 | 7.00 | 1.49700 | 81.55 | 42.7 | L15* | | −111.04 |
| 9 | −212.834 | (VARIABLE) | | | 43.0 | | | |
| 10 | −195.021 | 1.40 | 1.78472 | 25.68 | 49.5 | L21* | B21 | G2 |
| 11 | 205.08 | 9.65 | 1.61800 | 63.33 | 51.7 | L22 | | 208.98 |
| 12 | −66.268 | (VARIABLE) | | | 53.1 | | | |
| 13 | 128.319 | 5.27 | 1.80810 | 22.76 | 57.5 | L31* | | G3 |
| 14 | 886.07 | 0.30 | | | 57.5 | | | 59.57 |
| 15 | 47.577 | 11.00 | 1.80810 | 22.76 | 57.8 | L32* | | |
| 16 | 330.282 | 0.30 | | | 56.2 | | | |
| 17 | 45.429 | 11.11 | 1.59522 | 67.74 | 49.5 | L33* | B31 | |
| 18 | −209.692 | 1.40 | 1.80518 | 25.43 | 46.6 | L34* | | |
| 19 | 35.638 | 8.74 | | | 38.8 | | | |
| 20 (STOP) | INFINITY | 4.18 | | | 36.8 | St | | |
| 21 | 2304.09 | 1.20 | 1.85478 | 24.80 | 34.2 | L41* | B41 | G4 |
| 22 | 19.436 | 11.35 | 1.72916 | 54.68 | 31.1 | L42 | | 81.61 |
| 23 | −1472.152 | 4.00 | | | 30.5 | | | |
| 24 | −46.214 | 1.20 | 1.61340 | 44.27 | 30.0 | L43 | B42 | |
| 25 | 23.874 | 10.12 | 1.78590 | 44.20 | 30.7 | L44 | | |
| 26 | −57.399 | 7.85 | | | 30.5 | | | |
| 27 | −38.61 | 2.00 | 1.80835 | 40.55 | 30.6 | L45 | | |
| 28* | −81.197 | 14.21 | | | 32.5 | | | |
| 29 | 64.476 | 8.60 | 1.80810 | 22.76 | 48.3 | L46* | | |
| 30 | −205.186 | 26.00 | | | 48.3 | | | |
| 31 | INFINITY | 3.00 | 1.51680 | 64.17 | 43.6 | COVER | | |
| 32 | INFINITY | 1.00 | | | 43.2 | | | |

Fig. 3

| | K | A | B | C | D | E |
|---|---|---|---|---|---|---|
| S28 | 0.0415 | 4.36743E-06 | 3.48768E-09 | 1.16694E-11 | -3.46071E-14 | 8.79343E-17 |

Fig. 4

| OBJECT DISTANCE | INFINITY | 2280 mm | 230 mm |
|---|---|---|---|
| FOCAL LENGTH | 57.99 | 57.44 | 53.71 |
| F No. | 1.70 | 1.70 | 1.71 |
| ANGLE OF VIEW | 20.16 | 20.18 | 20.52 |
| d9 | 2.66 | 4.75 | 17.68 |
| d12 | 17.02 | 14.92 | 2.00 |

Fig. 10

| LENS SURFACE NUMBER (S) | RADIUS OF CURVATURE (Ri) | DISTANCE (di) | REFRACTIVE INDEX (nd) | ABBE NUMBER (νd) | EFFECTIVE DIAMETER (Di) | LENS | | FOCAL LENGTH (mm) |
|---|---|---|---|---|---|---|---|---|
| 1 | 113.251 | 7.96 | 1.85025 | 30.05 | 70.8 | L11* | | G1a |
| 2 | 2857.222 | 0.30 | | | 69.1 | | | −140.92 |
| 3 | 88.128 | 1.40 | 1.49700 | 81.55 | 60.8 | L12* | | |
| 4 | 40.36 | 11.67 | | | 53.5 | | | |
| 5 | −303.706 | 1.40 | 1.49700 | 81.55 | 53.1 | L13* | | |
| 6 | 72.428 | 23.63 | | | 49.4 | | | |
| 7 | −56.611 | 1.30 | 1.59270 | 35.31 | 42.5 | L14* | B11 | G1b |
| 8 | 88.136 | 7.00 | 1.49700 | 81.55 | 42.8 | L15* | | −108.87 |
| 9 | −221.945 | (VARIABLE) | | | 43.0 | | | |
| 10 | −168.295 | 1.40 | 1.71736 | 29.52 | 49.0 | L21* | B21 | G2 |
| 11 | 166.349 | 9.92 | 1.60300 | 65.44 | 51.6 | L22 | | 234.89 |
| 12 | −67.709 | (VARIABLE) | | | 53.1 | | | |
| 13 | 118.315 | 5.72 | 1.80810 | 22.76 | 57.8 | L31* | | G3 |
| 14 | 1188.658 | 0.30 | | | 57.8 | | | 60.14 |
| 15 | 48.403 | 10.72 | 1.80810 | 22.76 | 57.9 | L32* | | |
| 16 | 292.06 | 0.30 | | | 56.4 | | | |
| 17 | 46.426 | 10.99 | 1.59522 | 67.74 | 50.0 | L33* | B31 | |
| 18 | −234.648 | 1.40 | 1.80518 | 25.43 | 47.3 | L34* | | |
| 19 | 35.377 | 8.98 | | | 39.4 | | | |
| 20 (STOP) | INFINITY | 3.00 | | | 37.6 | St | | |
| 21 | 227.613 | 1.20 | 1.85478 | 24.80 | 35.4 | L41* | B41 | G4 |
| 22 | 20.025 | 11.06 | 1.72916 | 54.68 | 32.1 | L42 | | 82.29 |
| 23 | 271.259 | 4.00 | | | 31.2 | | | |
| 24 | −52.299 | 1.20 | 1.56732 | 42.82 | 30.8 | L43 | B42 | |
| 25 | 23.519 | 9.93 | 1.75700 | 47.82 | 31.0 | L44 | | |
| 26 | −69.555 | 8.97 | | | 30.6 | | | |
| 27 | −37.715 | 2.00 | 1.80835 | 40.55 | 29.9 | L45 | | |
| 28* | −81.348 | 14.16 | | | 31.9 | | | |
| 29 | 66.353 | 8.79 | 1.80810 | 22.76 | 48.2 | L46* | | |
| 30 | −164.708 | 26.00 | | | 48.2 | | | |
| 31 | INFINITY | 3.00 | 1.51680 | 64.17 | 43.6 | COVER | | |
| 32 | INFINITY | 1.00 | | | 43.2 | | | |

Fig. 11

| | K | A | B | C | D | E |
|---|---|---|---|---|---|---|
| S28 | -0.0679 | 4.88869E-06 | 4.81098E-09 | 4.83668E-12 | -4.25370E-15 | 4.44018E-17 |

Fig. 12

| OBJECT DISTANCE | INFINITY | 2280 mm | 230 mm |
|---|---|---|---|
| FOCAL LENGTH | 57.99 | 57.44 | 53.68 |
| F No. | 1.70 | 1.70 | 1.70 |
| ANGLE OF VIEW | 20.16 | 20.18 | 20.51 |
| d9 | 2.78 | 5.10 | 19.30 |
| d12 | 18.52 | 16.20 | 2.00 | ized on 
LENS SYSTEM AND IMAGE PICKUP APPARATUS

TECHNICAL FIELD

The present invention relates to a lens system and an image pickup apparatus.

BACKGROUND ART

Japanese Laid-open Patent Publication No. 2001-228391 discloses a retrofocus-type, inner-focus, wide-angle lens system that has a three-group configuration, a half angle of view of around 44°, and an F number of around 3.5. This wide-angle lens system is composed, in order from the object side, of a negative first lens group, a positive second lens group, and a positive third lens group that includes a stop. During focusing, the second lens group moves in the direction of the optical axis.

SUMMARY OF THE INVENTION

There is demand for a normal-type (standard-type) image pickup system (imaging system) that is brighter and has little fluctuation in angle of view due to focusing.

One aspect of the present invention is a lens system for image pickup including, in order from an object side: a first lens group that has negative refractive power and is fixed during focusing; a second lens group that has positive refractive power and moves during focusing; a third lens group that has positive refractive power and is fixed during focusing; and a fourth lens group that has a stop disposed on the object side, is fixed during focusing, has positive refractive power, and is disposed closest to an image plane side. The first lens group includes a first lens with positive refractive power that is disposed closest to the object side.

By disposing the first lens with positive refractive power closest to the object side (the most of object side) of the first lens group that has negative refractive power as a whole, it is possible to introduce a telephoto-type configuration with a positive-negative arrangement of powers into the first lens group. By doing so, it is possible to provide a lens system where the focal length can be easily extended while utilizing a retrofocus-type configuration where it is easy to obtain bright images. Accordingly, with this lens system, a focal length suited to a normal-type (standard-type) lens, for example, is obtained. In addition, by disposing a lens with positive refractive power closest to the object side, it is possible to improve the symmetry between the arrangements of powers of the object side and the image plane side of the lens system, which makes it possible to provide a lens system in which aberration is favorably corrected.

In addition, the first lens group may include a first sub-lens group that has negative refractive power and a second sub-lens group that has negative refractive power and is disposed on an image plane side with a distance far enough apart from the first sub-lens group. The first sub-lens group may include, in addition to the first lens with positive refractive power disposed closest to the object side, a lens with negative refractive power disposed closest to an image plane side. In addition, a distance W0 along an optical axis from a surface that is closest to the object side in the first sub-lens group to the image forming plane, a distance W1 along the optical axis from the surface that is closest to the object side to a surface that is closest to the image plane side in the first sub-lens group, and a distance W2 along the optical axis from the surface that is closest to the object side in the first sub-lens group to a surface closest to the object side in the second sub-lens group may satisfy the following Conditions (1) and (2).

$$0.05 < W1/W0 < 0.15 \tag{1}$$

$$0.17 < W2/W0 < 0.29 \tag{2}$$

This lens system is a retrofocus type with a negative-positive-positive-positive four-group configuration and is an inner focus system where only the second lens group moves along the optical axis during focusing. In addition, the lens system has a stop disposed between the third lens group and the fourth lens group that are fixed. When taking the sub-lens group units into account, the lens system is a retrofocus type with a negative-negative-positive-positive-positive five-group configuration, is an inner focus-type where only the third group moves along the optical axis during focusing, and also has a stop disposed between the fourth and fifth groups that are fixed.

A retrofocus type where the lens group closest to the object side has negative refractive power is suited to obtaining bright images and if anything is suited to wide-angle lenses. For this reason, in this lens system, the first lens group is divided into a first sub-lens group and a second sub-lens group that have negative refractive power and are disposed at a distance relatively farther apart than other lenses of the first lens group. By dispersing the negative power, the generation of aberration is suppressed and aberration correction is facilitated. In addition, by disposing, in the first sub-lens group, the first lens with positive refractive power closest to the object side and the lenses with negative refractive power closest to the image plane side, a telephoto-type configuration with a positive-negative arrangement of power is introduced into the first sub-lens group that is located on the object side. Accordingly, a configuration where the focal length can be easily extended can be realized while still utilizing a retrofocus-type configuration where it is easy to obtain bright images. In addition, by satisfying Condition (1), a state where the first sub-lens group with a telephoto-type configuration is compactly disposed along the optical axis and the focal length is suited to a normal (standard) lens is produced. Further, by satisfying Condition (2), the remaining second sub-lens group that has negative refractive power is disposed at a certain distance along the optical axis from the first sub-lens group and is close to the second lens group that moves during focusing. This means that the second sub-lens group is capable of dispersing or collimating the light flux condensed by the first sub-lens group along the optical axis, so that it is possible to suppress fluctuations in the angle of view due to focusing.

In addition, the rear group with positive refractive power in a retrofocus configuration is divided into three groups to disperse the power and suppress the power of the second lens group that moves during focusing, thereby producing a configuration with little fluctuation in angle of view even when the second lens group moves during focusing. Also, by disposing the stop between the third lens group and the fourth lens group that are fixed and do not move during focusing, the F number (F No.) is prevented from fluctuating due to focusing. This means that it is possible to provide a telephoto-type lens system where it is possible to freely adjust the focus while hardly considering fluctuations in the angle of view or fluctuations in brightness.

The third lens group may include, from the object side, at least one lens with positive refractive power and a cemented lens that is disposed adjacent to the stop and is composed of a lens with positive refractive power and a lens with negative refractive power. The fourth lens group may include, from the object side, a first cemented lens that is disposed adjacent to the stop and is composed of a lens with negative refractive power and a lens with positive refractive power, a second cemented lens composed of a lens with negative refractive power and a lens with positive refractive power, a lens with negative refractive power, and a lens with positive refractive power. Centered on the stop, a lens arrangement where a positive-negative arrangement of powers is repeated from the object side is mainly used on the object side, and a lens arrangement where a negative-positive arrangement of powers is repeated from the object side is mainly used on the image plane side. Accordingly, it is possible to provide a lens system that has a symmetrical arrangement of powers across the stop, which is suited to correction of aberration.

Another aspect of the present invention is an image pickup apparatus (imaging device) including the lens system described above and an image pickup element disposed on an image plane side of the lens system.

BRIEF DESCRIPTION OF DRAWINGS

FIG. 2 depicts data on the respective lenses of the lens system depicted in FIG. 1.

FIG. 3 depicts data on an aspherical surface in the lens system depicted in FIG. 1.

FIG. 4 depicts various numeric values of the lens system depicted in FIG. 1.

FIG. 10 depicts data on the respective lenses of the lens system depicted in FIG. 9.

FIG. 11 depicts data on an aspherical surface in the lens system depicted in FIG. 9.

FIG. 12 depicts various numeric values of the lens system depicted in FIG. 9.

DESCRIPTION OF EMBODIMENTS

Figure 1:
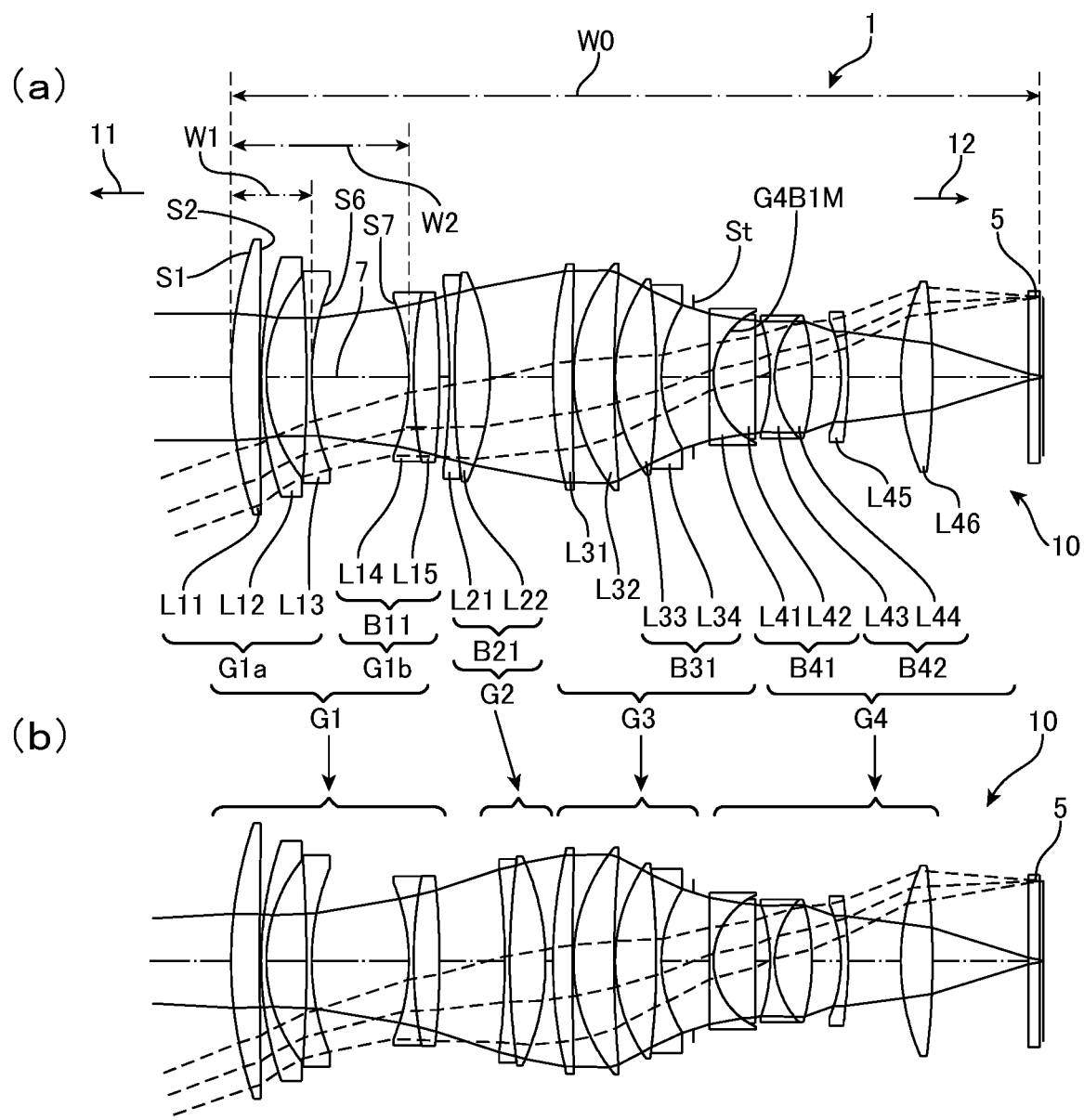
FIG. 1 depicts one example of a lens system and an image pickup apparatus, with FIG. 1(a) depicting a state where the lens system is focused at infinity, and FIG. 1(b) depicting a state where the lens system is focused at a near distance.

FIG. 1 depicts one example of an image pickup apparatus (camera or camera device) including an optical system for image pickup. FIG. 1(a) depicts a state where the system is focused at infinity, and FIG. 1(b) depicts a state where the system is focused at a near distance. The camera (image pickup apparatus, imaging device) 1 includes a lens system (optical system, image pickup optical system, or image forming optical system) 10 and an image pickup element (image pickup device, image plane, or image forming plane) 5 disposed on the image plane side (image side, image pickup side, or image forming side) 12 of the lens system 10. The image pickup lens system 10 is composed, in order from the object side (subject side) 11, of a first lens group G1 that has negative refractive power and is fixed during focusing, a second lens group G2 that has positive refractive power and moves during focusing, a third lens group G3 that has positive refractive power and is fixed during focusing, and a fourth lens group G4 that has positive refractive power, has a stop St disposed on the object side 11, and is fixed during focusing.

The lens system 10 is a negative-positive-positive-positive four-group, retrofocus type, is an inner-focus system where only the second lens group G2 moves along the optical axis 7 during focusing, and has the stop St disposed between the third lens group G3 and the fourth lens group G4 that are fixed. A retrofocus type where the lens group G1 closest to the object side 11 (the most of the object side, the most object side) has negative refractive power is suited to producing bright and sharp images, and is thought to be suited to wide-angle lenses. In the lens system 10, a first lens L11 with positive refractive power is disposed closest to the object side 11 in the first lens group G1. By disposing the lens L11 with positive refractive power closest to the object side 11 in the first lens group G1 that is closest to the object side 11 and has negative refractive power, it is possible to introduce a telephoto-type configuration with a positive-negative arrangement of refractive powers into the first lens group G1. This configuration makes it easy to obtain bright images with an overall retrofocus-type system, and makes it possible to provide a lens system 10 where it is easy to extend the focal length.

In addition, in the lens system 10, a cemented lens GB11 with overall negative refractive power is disposed closest to the image plane side 12 as the terminal (end, final) lens in the first lens group G1. The terminal lens closest to the image plane side 12 of the first lens group G1 may be a single negative lens. A telephoto-type configuration that has a positive-negative arrangement of refractive powers can be introduced into the arrangement of refractive powers between the object side 11 and the image plane side 12 of the first lens group G1 closest to the object side, which makes it possible to provide a lens system 10 with an overall retrofocus-type configuration capable of obtaining bright images and whose focal length can be easily extended.

In addition, the first lens group G1 is divided into a first sub-lens group G1a with negative refractive power and a second sub-lens group G1b with negative refractive power that are disposed with a certain distance in between, where the first sub-lens group G1a includes a first lens L11 with positive refractive power disposed closest to the object side 11 and a lens L13 with negative refractive power disposed closest to the image plane side 12 relatively apart from the first lens L11. The second sub-lens group G1b includes a negative cemented lens B11 that is the terminal lens, and in the present embodiment the second sub-lens group G1b is constructed of only this cemented lens B11. A distance W0 along the optical axis 7 from a surface that is closest to the object side 11 in the first sub-lens group G1a, that is, the surface S1 on the object side of the first lens L11, to the image forming plane 5, a distance W1 along the optical axis 7 from the surface S1 that is closest to the object side 11 in the first sub-lens group G1a to the surface that is closest to the image plane side 12, that is, the surface S6 on the image plane side 12 of the lens L13 that has negative refractive power, and a distance W2 along the optical axis 7 from the surface S1 that is closest to the object side 11 in the first sub-lens group G1a to a surface that is closest to the object side 11 in the second sub-lens group G1b, that is, the surface S7 on the object side 11 of the lens L14, satisfy the following Conditions (1) and (2).

$$0.05 < W1/W0 < 0.15 \quad (1)$$

$$0.17 < W2/W0 < 0.29 \quad (2)$$

The lower limit of Condition (1) may be 0.07 and the upper limit may be 0.13. The lower limit of Condition (2) may be 0.20 and the upper limit may be 0.26.

This lens system 10 is, if taking the sub-lens groups into account, a retrofocus type with a negative-negative-positive-positive-positive five-group configuration. This lens system 10 is an inner-focus system where only the lens group G2, which is the third lens group and comes after the lens groups G1a and G1b that are the first group and second group and have negative refractive power, moves along the optical axis during focusing. In addition, in this five-group lens system 10, the stop St is disposed between the lens groups G3 and G4 that are the fourth and fifth groups that are fixed. In either of these cases, as described earlier, a retrofocus configuration where the lens group closest to the object side has negative refractive power is suited to obtaining bright images and if anything is suited to wide-angle lenses. In the following description, although the system is described as being a four-group system, it should be clear that a five-group configuration including the sub-lens groups may be used.

In the present lens system 10, the first lens group G1 is divided into the first sub-lens group G1a and the second sub-lens group G1b that are disposed a distance far enough apart. By dispersing the negative power, the generation of aberration is suppressed and aberration correction is facilitated. At the same time, in the first sub-lens group G1a on the object side 11, by disposing the first lens L11 that has positive refractive power closest to the object side 11 and disposing the lens L13 that has negative refractive power closest to the image plane side 12, a telephoto-type configuration with a positive-negative arrangement of refractive powers is introduced. Accordingly, a configuration where the focal length can be easily extended can be realized while still utilizing a retrofocus-type configuration where it is easy to obtain bright images.

In addition, by satisfying Condition (1), the first sub-lens group G1a that has a telephoto-type configuration is compactly arranged along the optical axis 7 in a state where the focal length is suited to a normal lens. Accordingly, with the lens system 10 according to the present embodiment, suitable performance for a normal (standard) lens with a focal length of around 58 mm is obtained when focusing at infinity. In addition, by satisfying Condition (2), the second sub-lens group G1b with negative refractive power, which is one of divided lens groups of the first lens group G1, can be disposed with an enough distance from the first sub-lens group G1a, which is another divided lens group, along the optical axis 7. This means that the sub-lens group G1b, which is a lens group with negative refractive power, can be positioned closer to the second lens group G2 that has positive refractive power and moves during focusing. Accordingly, light flux that has been condensed by the first sub-lens group G1a can be dispersed or parallelized along the optical axis 7 by the second sub-lens group G1b, which makes it possible to suppress fluctuations in the angle of view due to focusing (so-called "breathing") where the second lens group G2 moves. Since the position where the light flux (light rays) crosses does not greatly fluctuate when the second lens group G2 moves for focusing, it is possible to provide enough movement for focusing and it is easy to correct aberration when changing focus.

In a retrofocus-type lens system in which the first lens group G1 has negative refractive power, the light flux is likely to spread, so that the apertures of lenses in the rear group tend to increase. By using a "positive-lead" configuration where the lens L11 with positive refractive power is disposed closest to the object side 11 in the first lens group G1, spreading of the light flux can be suppressed, which means the apertures of the lenses in the rear group can be reduced. In particular, suppressing the apertures of the second lens group G2 that moves during focusing has advantages in that the weight of the second lens group G2 can be reduced and the load on any moving mechanism can be reduced. Accordingly, it is possible to provide a lens system 10 that is compact and easy to focus.

It is desirable for the lens L11 with positive refractive power that is closest to the object side 11 in the first lens group G1 to be provided with a certain amount of refractive power, and in particular, for the surface S1 that is closest to the object side 11 to have positive refractive power. On the other hand, to satisfy Condition (1), it is desirable for the curvature of the surface S2 on the image plane side 12 to be small to enable the following lens with negative refractive power to be disposed close by. Accordingly, the radius of curvature R1 of the surface S1 on the object side 11 of the first lens L11 with positive refractive power disposed closest to the object side 11 in the lens system 10, that is, closest to (the most of) the object side 11 in the first lens group G1 (the first sub-lens group G1a) and the radius of curvature R2 of the surface S2 on the image plane side 12 may satisfy the following Condition (3).

$$0 \le |R1/R2| \le 0.2 \quad (3)$$

The upper limit of Condition (3) may be 0.1. As indicated by the lower limit of Condition (3), the surface S2 on the image plane side 12 may be flat.

In addition, the first sub-lens group G1a includes, in order from the object side 11, the first lens L11, a second lens L12 that has negative refractive power, and the negative third lens L13 that is concave on the object side 11 and is disposed closest to the image plane side 12. In the lens system 10 according to the present embodiment, the first sub-lens group G1a includes the positive meniscus lens L11, which is close to plano-convex and is convex on the object side 11, the negative meniscus lens L12 that is convex on the object side 11, and the biconcave negative lens L13. Since the first sub-lens group G1a has a positive-negative-negative configuration and also has negative refractive power as a whole, the refractive power of the second lens L12 and the third lens L13 increases. Accordingly, it is easy to adjust the light flux that propagates from the first sub-lens group G1a to the later lens groups to a direction parallel to the optical axis 7. This means that the light flux that passes via the second sub-lens group G1b tends to be parallel or slightly spreading with respect to the optical axis 7, and passes through substantially the same position even if the second lens group G2 moves for focusing. This makes this configuration suited to suppressing fluctuations in magnification and fluctuations in the angle of view during focusing.

In addition, a configuration including the negative meniscus lens L12 and the negative lens L13 that are concave in facing directions is suited to reducing the Petzval sum in the first sub-lens group G1a. Due to this, it is easy to perform aberration correction in the first sub-lens group G1a.

The second lens L12 and the third lens L13 of the first sub-lens group G1a may be low anomalous dispersion lenses. Various aberrations such as chromatic aberration of magnification can be favorably corrected. Accordingly, it is possible to reduce the number of aspherical surfaces, so that a lens system 10 in which aberration is favorably corrected can be provided at low cost.

The second sub-lens group G1b may include a negative meniscus lens B11 that is concave on the object side 11. As a first lens group G1 composed of a first sub-lens group G1a and a second sub-lens group G1b, it is possible to use a configuration where convex surfaces are disposed on the object side 11 and the image plane side 12 and concave surfaces face each other on the inside, so that the Petzval sum in the first lens group G1 can be reduced. This means that it is possible to favorably correct aberration in the first lens group G1 and to supply light flux whose aberration has been favorably corrected to the second lens group G2 used for focusing, which reduces fluctuations in the angle of view due to focusing (so-called "breathing"). This configuration is favorable for improving astigmatism, and is also effective in reducing the difference between sagittal rays and meridional rays. This is also effective in improving the MTF (Modulation Transfer Function). In particular, spherical aberration during short-range shooting (image pickup at a near distance) can be favorably corrected, so that sharp images can be obtained.

The negative meniscus-type cemented lens B11 provided in the second sub-lens group G1b may be a combination, from the object side 11, of a lens L14 (in the present embodiment, a biconcave negative lens) with negative refractive power and high anomalous dispersion and a lens L15 (in the present embodiment, a biconvex positive lens) with positive refractive power and low anomalous dispersion. By using a combination of anomalous dispersion lenses, it is possible to reduce chromatic aberration of magnification and spherical aberration, in addition to axial chromatic aberration. By suppressing or improving the occurrence of various aberrations in the first lens group G1 and also improving the MTF, it is possible to correct various aberrations for the second lens group G2 that moves during focusing or reduce the correction needs for aberration that is produced. This means that it is possible to provide a lens system 10 where it is possible to reduce the weight of the second lens group G2, making the system compact and easy to handle.

In addition, in a retrofocus-type lens system, since the rear group typically has strong positive refractive power, the angle of view will tend to vary in an inner-focus system where a lens with a positive refractive power moves during focusing. For this reason, in the lens system 10, the rear group with positive refractive power is divided into three groups to disperse the power and the refractive power of the second lens group G2 that moves during focusing is suppressed, thereby producing a configuration where even if the second lens group G2 moves during focusing, the magnification hardly fluctuates and there is little breathing. In addition, by disposing the stop St between the third lens group G3 and the fourth lens group G4 which are fixed and do not move during focusing, the F number is prevented from fluctuating due to focusing. This means that it is possible to provide a telephoto-type lens system where the focus can be freely adjusted while hardly considering fluctuations in the angle of view and fluctuations in brightness.

The second lens group G2 may be a single or a cemented lens of meniscus-type lens that has positive refractive power and is concave on the object side 11. In the lens system 10 according to the present embodiment, the second lens group G2 is composed of a positive meniscus-type cemented lens B21 that is concave on the object side 11 and includes, from the object side 11, a biconcave negative lens L21 and a biconvex positive lens L22. A retrofocus-type system has strong positive refractive power and the Petzval sum tends to increase. In this lens system 10, increases in the Petzval sum are suppressed by disposing a surface that is concave on the object side 11 in the second lens group G2 positioned closest to the object side 11 out of the rear group that has positive refractive power, which makes it possible to provide a lens system 10 that can favorably correct aberration, and in particular spherical aberration and coma aberration.

In addition, by using a surface that is concave on the object side 11 as the object side 11 surface of the cemented lens B21 that faces the first lens group G1 on the object side 11, it becomes possible to position the second lens group G2 closer to the first lens group G1 during focusing. By doing so, light flux, including peripheral light, that tends to spread at the first lens group G1 that has negative refractive power can be captured by the second lens group G2 and transmitted to lens groups on the image plane side 12. This means that it is possible to provide a lens system 10 that is brighter and has a small F number. Also, by disposing the second lens group that has positive refractive power close to the first lens group G1 that has negative refractive power, the spreading of light flux can be suppressed, which makes it possible to suppress the sizes of the third lens group G3 onwards on the image plane side, so that a more compact lens system 10 can be provided.

Also, due to the second lens group G2 that performs focusing including the cemented lens B21 or being constructed of the cemented lens B21, it is possible to provide the second lens group G2 with a function of correcting aberration in keeping with the focusing distance, and in particular, a function of correcting chromatic aberration. The cemented lens B21 in the second lens group G2 is a cemented lens composed, from the object side 11, of the lens L21 with negative refractive power and the lens L22 with positive refractive power, where the lens L21 with positive refractive power may be a low anomalous dispersion lens. Axial chromatic aberration can be effectively corrected.

The third lens group G3 includes, in order from the object side 11, lenses L31 and L32 that have positive refractive power and a cemented lens B31 that has positive refractive power and is composed of a lens L33 with positive refractive power and a lens L34 with negative refractive power. In a retrofocus-type configuration, although the rear group is provided with strong positive refractive power, chromatic aberration can be improved by providing the cemented lens B31 that has positive refractive power in the third lens group. In addition, by disposing the positive lenses L31 and L32 on the object side 11 and using a configuration where the positive lenses L31, L32, and L33 are aligned from the object side 11, it is possible to disperse the surfaces with positive refractive power and thereby possible to suppress sharp bending of the light flux. Accordingly, this configuration is suited to improving spherical aberration.

The fourth lens group G4 includes, in order from the object side 11, a first cemented lens B41 composed of a lens L41 with negative refractive power and a lens L42 with positive refractive power, a second cemented lens B42 composed of a lens L43 with negative refractive power and a lens L44 with positive refractive power, a negative meniscus lens L45 that is concave on the object side, and a lens L46 with positive refractive power. The fourth lens group G4 as a whole is a combination of negative-positive-negative-positive-negative-positive lenses from the object side 11, so that axial chromatic aberration can be easily corrected. In addition, by providing independent surfaces through the use of independent lenses as the two lenses on the image plane side 12, it is easy to correct other aberrations, including chromatic aberration of magnification.

In addition, the fourth lens group G4 has a negative-positive configuration disposed adjacent to the stop St, which is a symmetrical arrangement of refractive powers compared to the third lens group G3 on the other side of the stop St that has a positive-negative configuration disposed adjacent to the stop St. This configuration is favorable for aberration correction. That is, a configuration where the third lens group G3 includes the cemented lens B31 that is disposed adjacent to the stop St and includes, from the object side 11, the lens L33 with positive refractive power and the lens L34 with negative refractive power, and the fourth lens group G4 includes the cemented lens B41 that is disposed adjacent to the stop St and includes, from the object side 11, the lens L41 with negative refractive power and the lens L42 with positive refractive power, has a high degree of symmetry across the stop St, making it easy to favorably correct aberration.

In the lens system 10, the third lens group G3 is on the object side 11 of the stop St and includes, from the object side 11, the at least one lens L32 with positive refractive power and the cemented lens B31 composed of the lens L33 with positive refractive power and the lens L34 with negative refractive power. The cemented lens B31 is adjacent to the stop St. The fourth lens group G4 disposed on the other side of the stop St includes the cemented lens (first cemented lens) B41 that is disposed adjacent to the stop St and is composed from the object side 11 of the lens L41 with negative refractive power and the lens L42 with positive refractive power, the cemented lens (second cemented lens) B42 composed of the lens L43 with negative refractive power and the lens L44 with positive refractive power, and the lens L45 with negative refractive power. This configuration has a high degree of symmetry of refractive powers across the stop St and is suited to aberration correction.

In addition, in this lens system 10, the first lens group G1 includes the first sub-lens group G1a that has the first lens L11 with positive refractive power disposed closest to the object side 11 (the most of object side) and the lens L13 with negative refractive power disposed closest to the image plane side 12, and the fourth lens group G4 includes the lens L46 with positive refractive power that is disposed closest to the image plane side 12 (the most of image plane side) and is adjacent to the lens L45 with negative refractive power. Accordingly, the lens arrangement (arrangement of refractive powers) on the most object side 11 and the most image plane side 12 of the lens system 10 has a high degree of symmetry, which is suited to aberration correction.

Also, in the lens system 10, a configuration with two lenses, that is, the lenses L31 and L32, is used as the lenses with positive refractive power on the object side 11 of the cemented lens B31 of the third lens group G3. This means that while maintaining symmetry of refractive power between the third lens group G3 and the fourth lens group G4 across the stop St, the positive refractive power is dispersed and processed by a number of lenses, which increases the number of lens surfaces available for aberration correction. Accordingly, this configuration is suited to aberration correction, and in particular correction of spherical aberration.

In addition, the fourth lens group G4 includes, on the image plane side 12 of the lens L45 with negative refractive power, a lens L46 with positive refractive power as the lens closest to the image plane side 12 of the lens system 10. With respect to the image plane 5, the light flux is expanded from the optical axis 7 by the lens L45 with negative refractive power and can be made parallel to the optical axis 7 by this lens L46 that has positive refractive power.

Accordingly, it is possible to perpendicularly (that is, in parallel with the optical axis 7) form the light flux into an image with a large image circle on the image plane 5, and possible to reduce the incident angle of light on the image plane 5, which makes it possible to form larger and sharper images. In particular, the surface on the image plane side 12 of the lens L45 that has negative refractive power may be convex on the image plane side 12, and the lens L46 with positive refractive power may be a biconvex positive lens. By dispersing the positive refractive power immediately before the image plane 5 among a plurality of surfaces, it is possible to suppress the generation of aberration and to also favorably perform aberration correction.

One example of the cemented lens (first cemented lens) B41 on the object side 11 of the fourth lens group G4 is a combination of a lens L41 with negative refractive power and high anomalous dispersion and a lens L42 with positive refractive power and low dispersion. By using anomalous dispersion-type lenses in the cemented lens, it is possible to favorably correct chromatic aberration of magnification in addition to axial chromatic aberration.

The half spherical ratio, which is the ratio between the effective radius G4B1MH and the radius of curvature G4B1Mr of the cemented surface G4B1M (in the present embodiment, the surface S22) of the first cemented lens B1 in the fourth lens group G4 may satisfy the following Condition (4).

$$0.65 < |G4B1MH/G4B1Mr| \leq 0.85 \quad (4)$$

In the fourth lens group G4 disposed between the image plane side 12 of the stop St and the image plane 5, it is desirable for various aberrations, and in particular chromatic aberration of magnification, to be favorably corrected. Since chromatic aberration of magnification can be sufficiently corrected by the cemented lens B41 that is disposed closest to the object side 11 in the fourth lens group G4 and near to the image plane side 12 of the stop St, it is possible to greatly reduce the aberration correction load of the following lenses. To do so, it is desirable for the cemented surface G4B1M of the first cemented lens B41 to have a certain degree of curvature. In particular, as described earlier, in a cemented lens B41 that is a combination of the lens L41 with negative refractive power and high anomalous dispersion and the lens L42 with positive refractive power and low dispersion, providing the cemented surface G4B1M with a certain degree of curvature is effective for correcting chromatic aberration of magnification.

It is also desirable for the cemented surfaces of the cemented lenses B41 and B42 in the fourth lens group G4 to both be convex on the object side 11 and symmetrical to the cemented surface of the cemented lens B31 in the third lens group G3 (which is concave on the object side 11). These cemented surfaces have a symmetrical arrangement with respect to the stop St, which is a configuration suited to aberration correction.

In the second cemented lens B42, the lens L43 with negative refractive power is a high-dispersion lens, and the lens L44 with positive refractive power is a low-dispersion lens. The Abbe number vB42a of the lens L43 with negative refractive power and the Abbe number vB42b of the lens L44 with positive refractive power may satisfy the following Condition (5).

$$0.70 \leq vB42a/vB42b \leq 1.45 \tag{5}$$

The lower limit of Condition (5) may be 0.9, and the upper limit may be 1.2. An anomalous dispersion-type lens may be used in the cemented lens B42, which makes it possible to favorably correct chromatic aberration of magnification in addition to axial chromatic aberration.

A more detailed description will now be given with reference to the drawings. FIG. 1 depicts the lens arrangement of the lens system 10 in different states. FIG. 1(a) depicts the lens arrangement when the focus position is at infinity, and FIG. 1(b) depicts the lens arrangement when the focus position is the shortest position (near distance, 230 mm).

The lens system 10 is a normal (standard) lens with a focal length of around 58 mm at infinity, and has a suitable configuration for an interchangeable lens of the camera 1 used for shooting or recording (image pickup) of movies or video. The lens system 10 has a four-group configuration composed, in order from the object side 11, of the first lens group G1 with overall negative refractive power, the second lens group G2 with overall positive refractive power, the third lens group G3 with overall positive refractive power, the stop St, and the fourth lens group G4 with overall positive refractive power. The first lens group G1, the third lens group G3, and the fourth lens group G4 are fixed lens groups that do not move, so that the distance from the image plane 5 does not change during focusing. When the focus position moves from infinity to the near distance during focusing, the second lens group G2 monotonously moves toward the image plane side 12.

In even more detail, the first lens group G1 includes the first sub-lens group (former group) G1a that is positioned on the object side 11 and the second sub-lens group (latter group) G1b that is disposed on the image plane side 12, the two sub-lens groups being disposed sufficient distance apart. Accordingly, the lens system 10 may have a negative-negative-positive-positive-positive five-group configuration.

FIG. 2 depicts data on the respective lenses that construct the lens system 10. The radius of curvature (Ri) is the radius of curvature (in mm) of each surface of each lens disposed in order from the object side 11, the distance di is the distance (interval, in mm) between the respective lens surfaces, the effective diameter (Di) is the effective diameter of each lens surface (diameter, in mm), the refractive index nd is the refractive index (d-line) of each lens, and the Abbe number vd is the Abbe number (d-line) of each lens. In FIG. 2, the surfaces that have a surface number marked with an asterisk are aspherical surfaces, and the lenses whose lens names have been marked with an asterisk are lenses that use anomalous dispersion glass. The same applies to the embodiments described later.

FIG. 3 depicts coefficients of the aspherical surface included in the lens system 10. In this example, the surface S28 on the image plane side of the lens L45 of the fourth lens group G4 is aspherical. In view of this system being an interchangeable lens, it is desirable for the aspherical surfaces to be surfaces located inside the lens system 10. Also, in view of cost, it is desirable to include few aspherical surfaces. In the lens system 10 according to the present embodiment, a sufficient aberration correction function is achieved by using the configuration described above, so that it is sufficient to use only one aspherical surface. This means a lens system 10 that obtains bright and sharp images is provided at low cost.

When X is the coordinate in the optical axis direction, Y is the coordinate in the direction perpendicular to the optical axis, the direction in which light propagates is positive, and R is the paraxial radius of curvature, the aspherical surface is expressed by the following equation (X) using the coefficients K, A, B, C, D, and E depicted in FIG. 3. The same also applies to the following embodiments. Note that "En" means "10 to the nth power".

$$X=(1/R)Y^2/[1+\{1-(1+K)(1/R)^2Y^2\}^{1/2}]\pm AY^4+BY^6+CY^8+DY^{10}+EY^{12} \tag{X}$$

FIG. 4 depicts the values of the focal distance f, the F number (F No.), the angle of view, and the variable intervals d9 and d12 in the lens system 10 when the focal length of the lens system 10 is at infinity, at an intermediate position (2280 mm), and at the nearest distance (shortest position, 230 mm).

Figure 5:
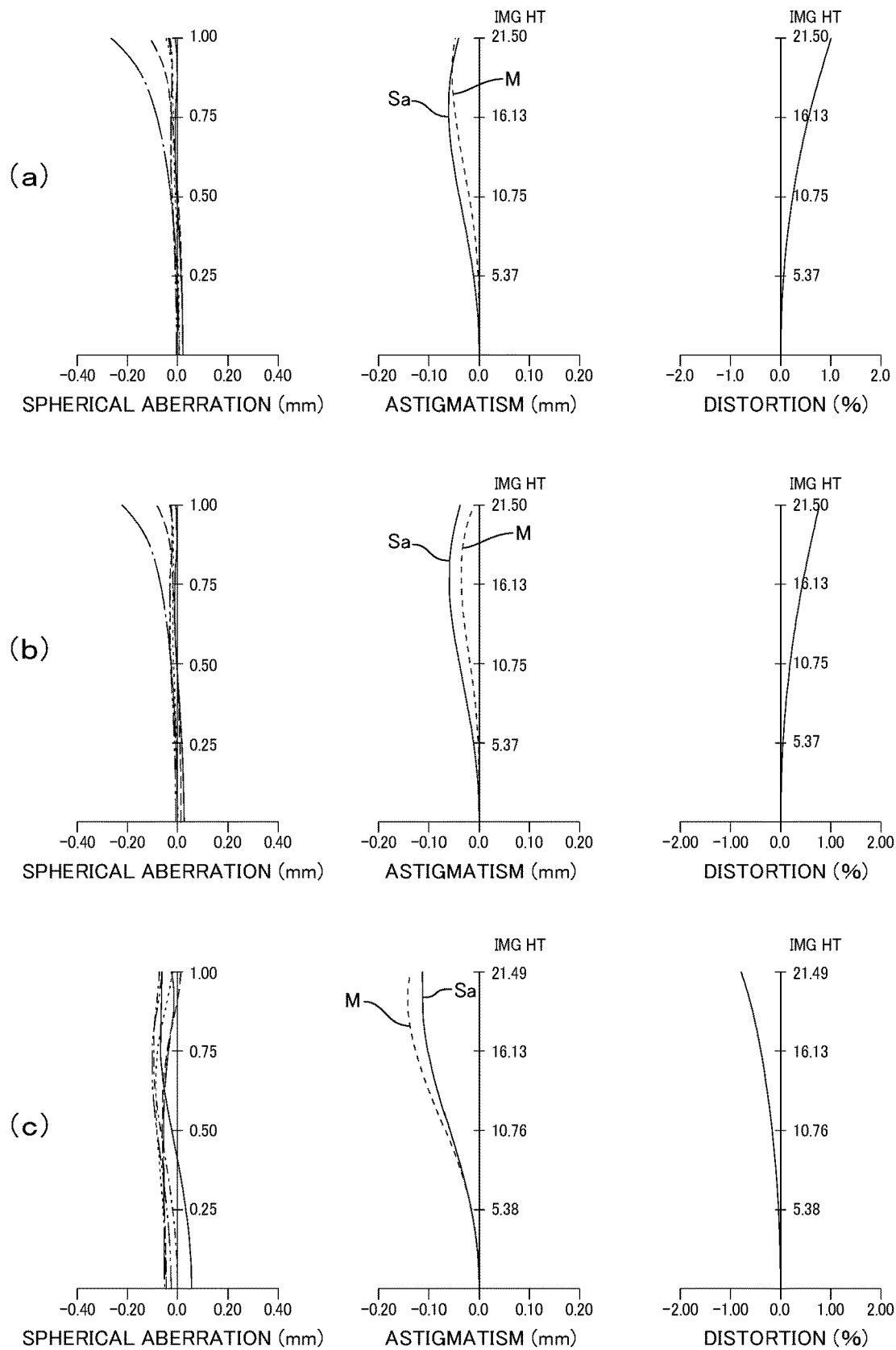
FIG. 5 depicts various aberrations of the lens system depicted in FIG. 1.
Figure 6:
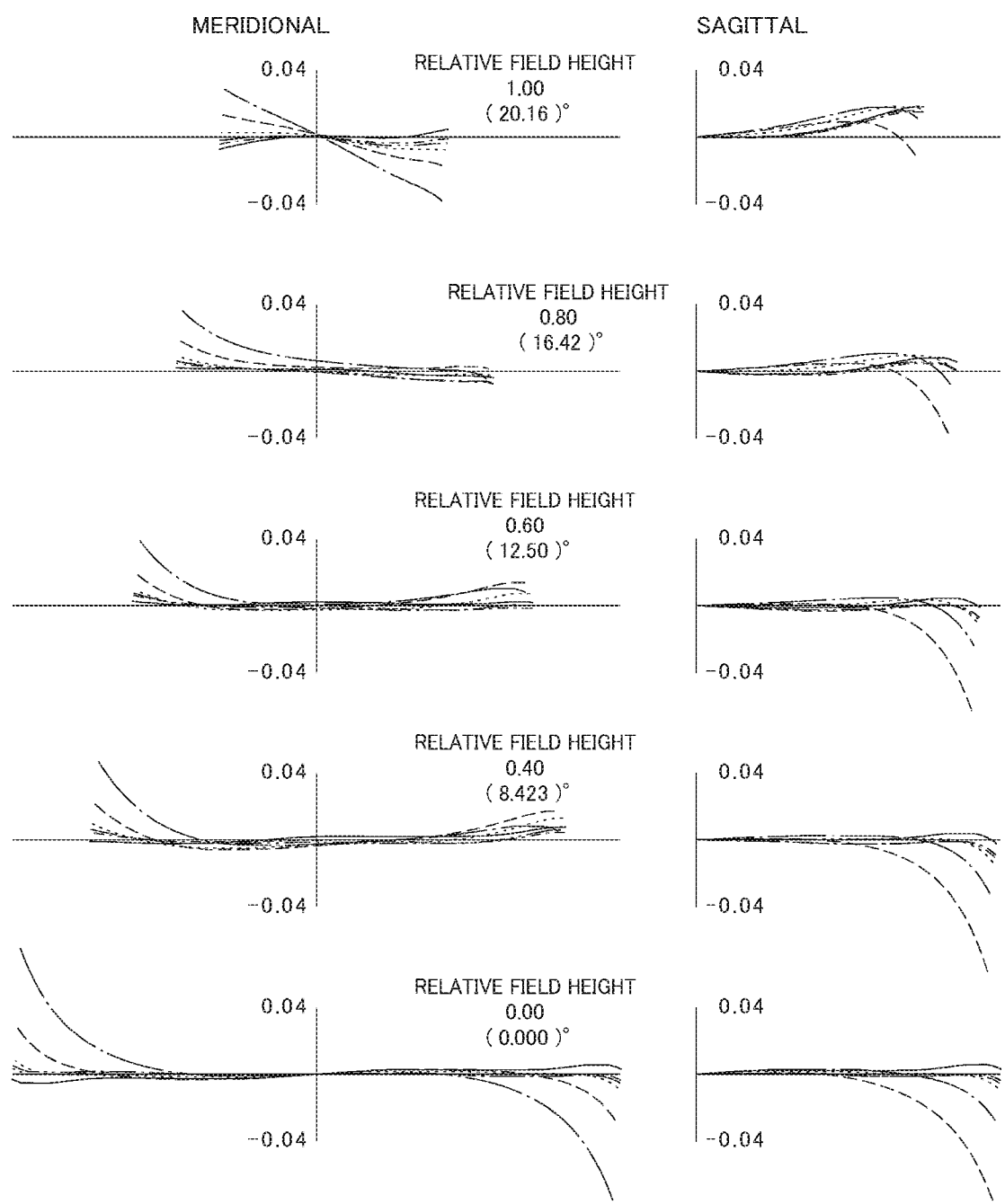
FIG. 6 depicts the transverse aberration at infinity of the lens system depicted in FIG. 1.
Figure 7:
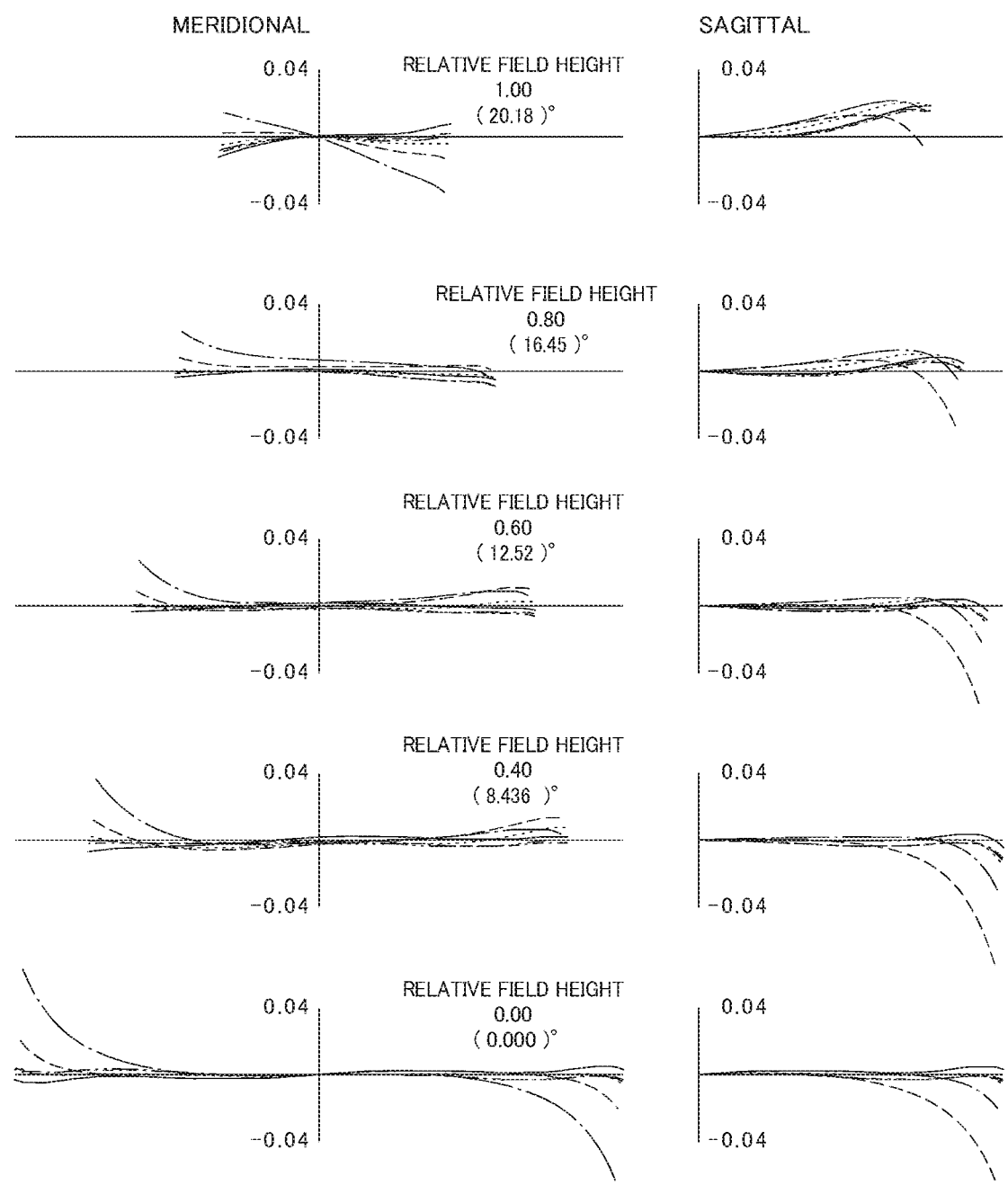
FIG. 7 depicts the transverse aberration at an intermediate distance of the lens system depicted in FIG. 1.
Figure 8:
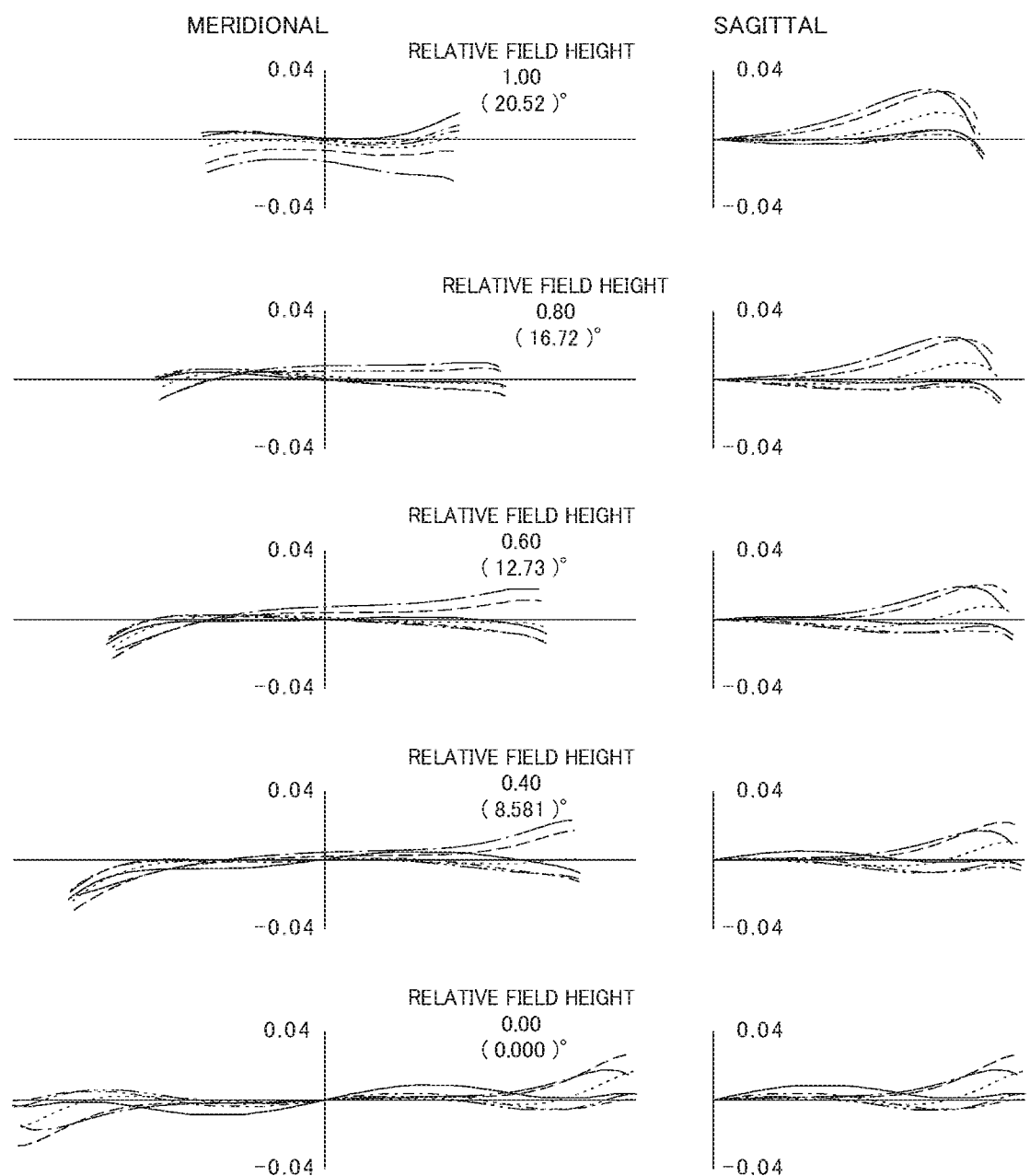
FIG. 8 depicts the transverse aberration at the nearest distance of the lens system depicted in FIG. 1.

FIG. 5 depicts spherical aberration, astigmatism, and distortion for when the focal length of the lens system 10 is at infinity (FIG. 5(a)), at an intermediate position (2280 mm) (FIG. 5(b)), and at the nearest distance (230 mm) (FIG. 5(c)). FIG. 6 depicts the transverse aberration at infinity, FIG. 7 depicts the transverse aberration at an intermediate position (2280 mm), and FIG. 8 depicts the transverse aberration at the nearest distance (shortest position, 230 mm). Spherical aberration is depicted for the wavelengths of 404.6560 nm (dot-dash line), 435.8340 nm (dashed line), 486.1330 nm (dotted line, short dashed line), 546.0740 nm (dot-dot-dash line), 587.5620 nm (short dot-dash line), and 656.2720 nm (solid line). Astigmatism is depicted for meridional (tangential) rays M and sagittal rays Sa. The same applies to the aberration diagrams described later.

The lens system 10 depicted in these drawings is composed of a total of 17 lenses (L11 to L15, L21 to L22, L31 to L34, and L41 to L46). The first lens group G1 disposed closest to the object side 11 of the lens system 10 includes, from the object side 11, the negative first sub-lens group G1a and the negative second sub-lens group G1b. The first sub-lens group G1a has a three-lens configuration composed, in order from the object side 11, of a meniscus lens (first lens) L11 that has positive refractive power and is convex on the object side 11, the meniscus lens (second lens) L12 that has negative refractive power and is convex on the object side 11, and the biconcave negative lens (third lens) L13.

The second sub-lens group G1b has a single-lens (cemented lens) configuration composed of the cemented lens B11 composed of a biconcave negative lens L14 and a biconvex positive lens L15. The cemented lens B11 is a negative meniscus lens that is concave on the object side 11.

The second lens group G2, which is the focusing lens group, is the cemented lens B21 that is composed of the biconcave negative lens L21 and the biconvex positive lens L22. The second lens group G2 has, as whole, a single cemented lens configuration that is a positive meniscus type and concave on the object side 11.

The third lens group G3 is composed, in order from the object side 11, of the positive meniscus lenses L31 and L32 that are convex on the object side 11 and the cemented lens B31 composed of the biconvex positive lens L33 and the biconcave negative lens L34.

The fourth lens group G4, which is disposed on the image plane side 12 of the third lens group G3 with the stop St in between and is closest to the image plane side 12 of the lens system 10, is composed of the cemented lens B41, which is made up of the negative meniscus lens L41 that is convex on the object side 11 and the biconvex positive lens L42, the cemented lens B42 which is made up of the biconcave negative lens L43 and the biconvex positive lens L44, the negative meniscus lens L45 that is concave on the object side 11, and the biconvex positive lens L46.

The lens system 10 depicted in FIG. 1 includes all of the configurations described above, and the values of the respective conditions are as follows.

| | |
|---|---|
| (W1/W0):0.099(21.85/220.00) | Condition (1) |
| (W2/W0):0.219(48.15/220.00) | Condition (2) |
| (|R1/R2|):0.03 | Condition (3) |
| (|G4B1MH/G4B1Mr|(|D22/2/R22)):0.80 | Condition (4) |
| (vB42a/vB42b(v43/v44)):1.00 | Condition (5) |

The lens system 10 depicted in FIG. 1 satisfies all of Conditions (1) to (5) and, for a normal-type lens system with a focal length of around 58 mm, has a sufficiently large angle of view of around 20 degrees and is extremely bright with an F number of 1.70. In addition, with the lens system 10, when focusing from infinity to the near distance, the F number is fixed, the angle of view hardly changes, and there is hardly any breathing or fluctuations in magnification. Accordingly, it is possible to easily perform focusing and obtain images that are sharp and have little fluctuation in brightness at the desired focal position. In addition, as depicted in FIGS. 5 to 8, it is possible to acquire images in which various aberrations are favorably corrected across the entire focusing range.

Figure 9:
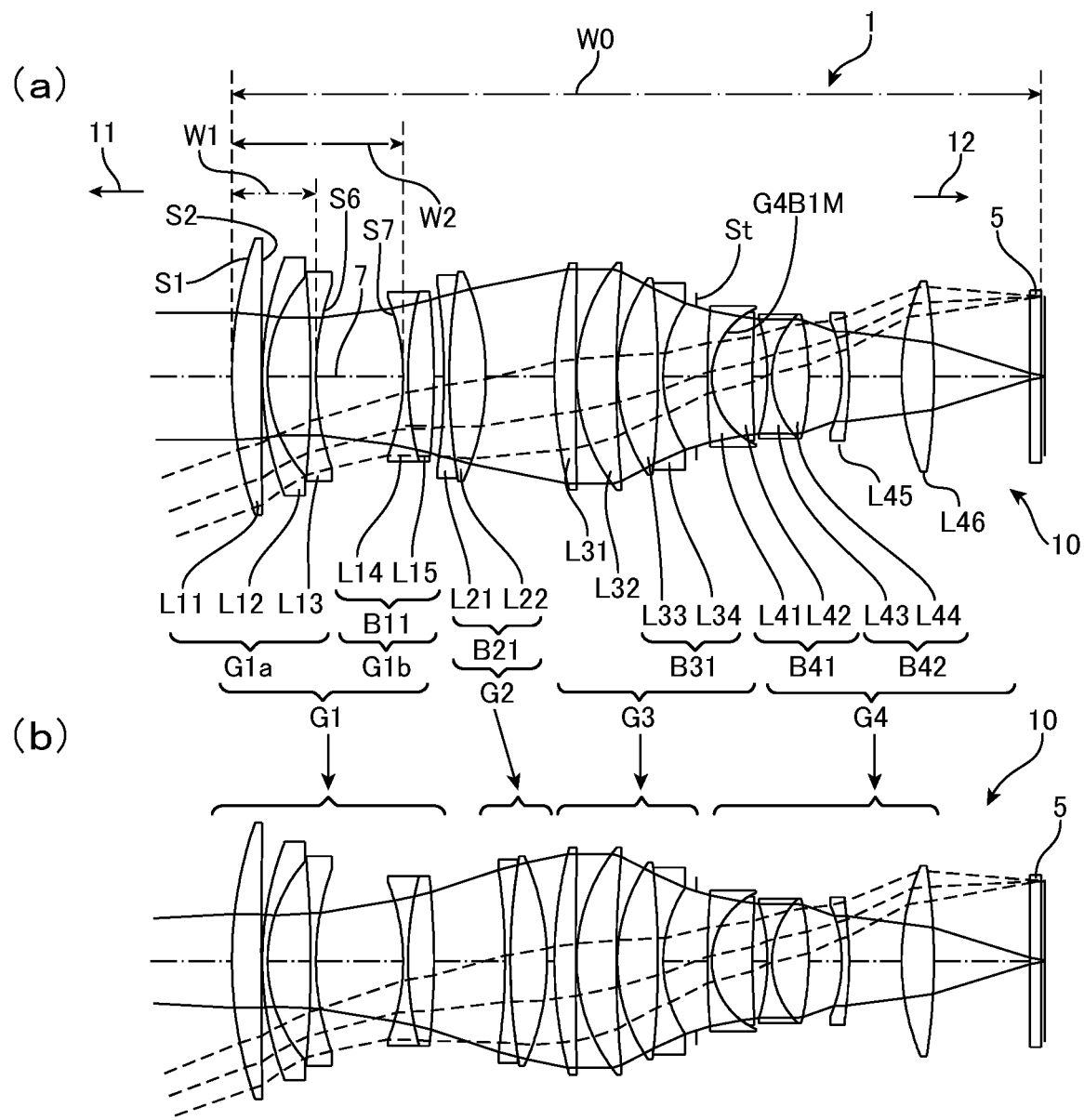
FIG. 9 depicts another example of a lens system and an image pickup apparatus, with FIG. 9(a) depicting a state where the lens system is focused at infinity and FIG. 9(b) depicting a state where the lens system is focused at a near distance.

FIG. 9 depicts a different lens system 10. FIG. 9(a) depicts the lens arrangement when the focus position is at infinity, and FIG. 9(b) depicts the lens arrangement when the focus position is the nearest distance (shortest position, 230 mm). This lens system 10 is also constructed of a total of 17 lenses (L11 to L15, L21 to 22, L31 to L34, and L41 to L46), and includes, in order from the object side 11, a first lens group G1 that has negative refractive power and is fixed during focusing, a second lens group G2 that has positive refractive power and moves during focusing, a third lens group G3 that has positive refractive power and is fixed during focusing, and a fourth lens group G4 that has a stop St disposed on the object side 11, has positive refractive power, and is fixed during focusing.

Accordingly, this lens system 10 is also a retrofocus type with a negative-positive-positive-positive four-group configuration, and is an inner-focus system where only the second lens group G2 moves along the optical axis 7 during focusing. In addition, the lens system also has the stop St disposed between the third lens group G3 and the fourth lens group G4 that are fixed.

The first lens group G1 includes the first sub-lens group G1a with negative refractive power on the object side 11 and the second sub-lens group G1b with negative refractive power on the image plane side 12. Accordingly, this lens system can be said to be a retrofocus type with a negative-negative-positive-positive-positive five-group configuration. The first sub-lens group G1a includes a biconvex positive lens L11 that is disposed closest to the object side 11 and a lens L13 with negative refractive power that is concave on the object side 11 and is disposed closest to the image plane side 12. The lens system 10 as a whole has a retrofocus-type configuration, but is bright and has sufficient performance as a standard-type lens system.

Figure 13:
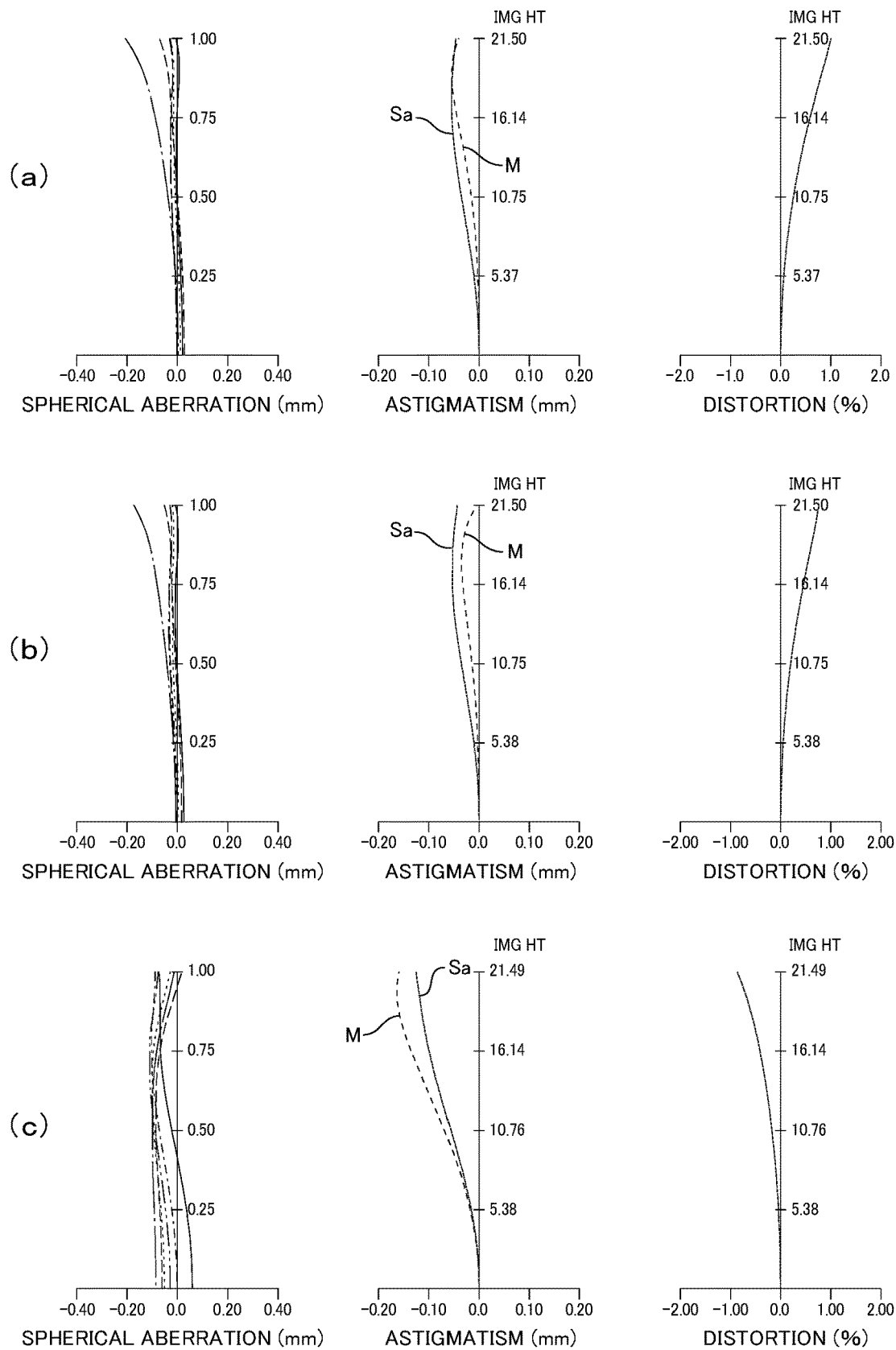
FIG. 13 depicts various aberrations of the lens system depicted in FIG. 9.
Figure 14:
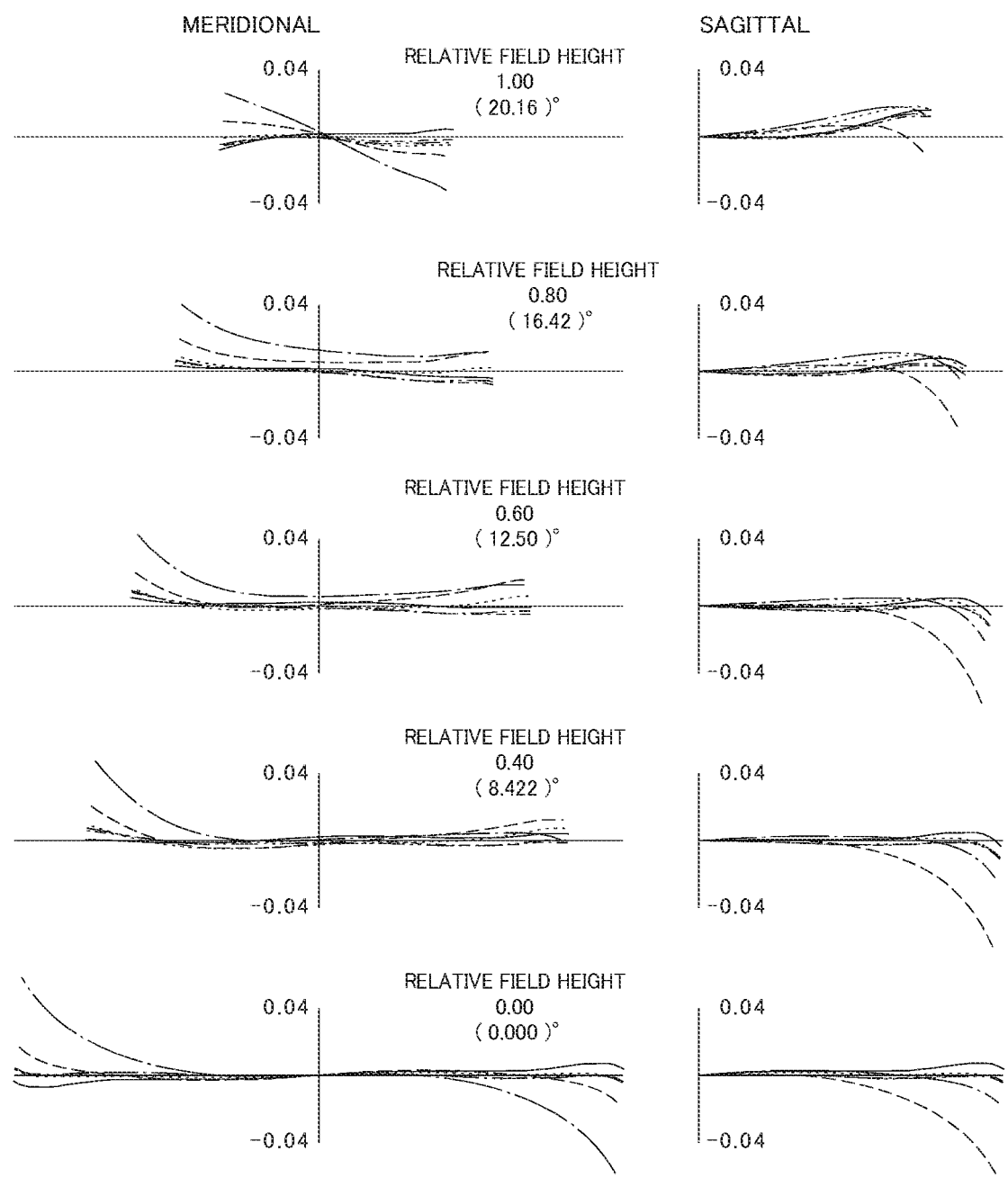
FIG. 14 depicts the transverse aberration at infinity of the lens system depicted in FIG. 9.
Figure 15:
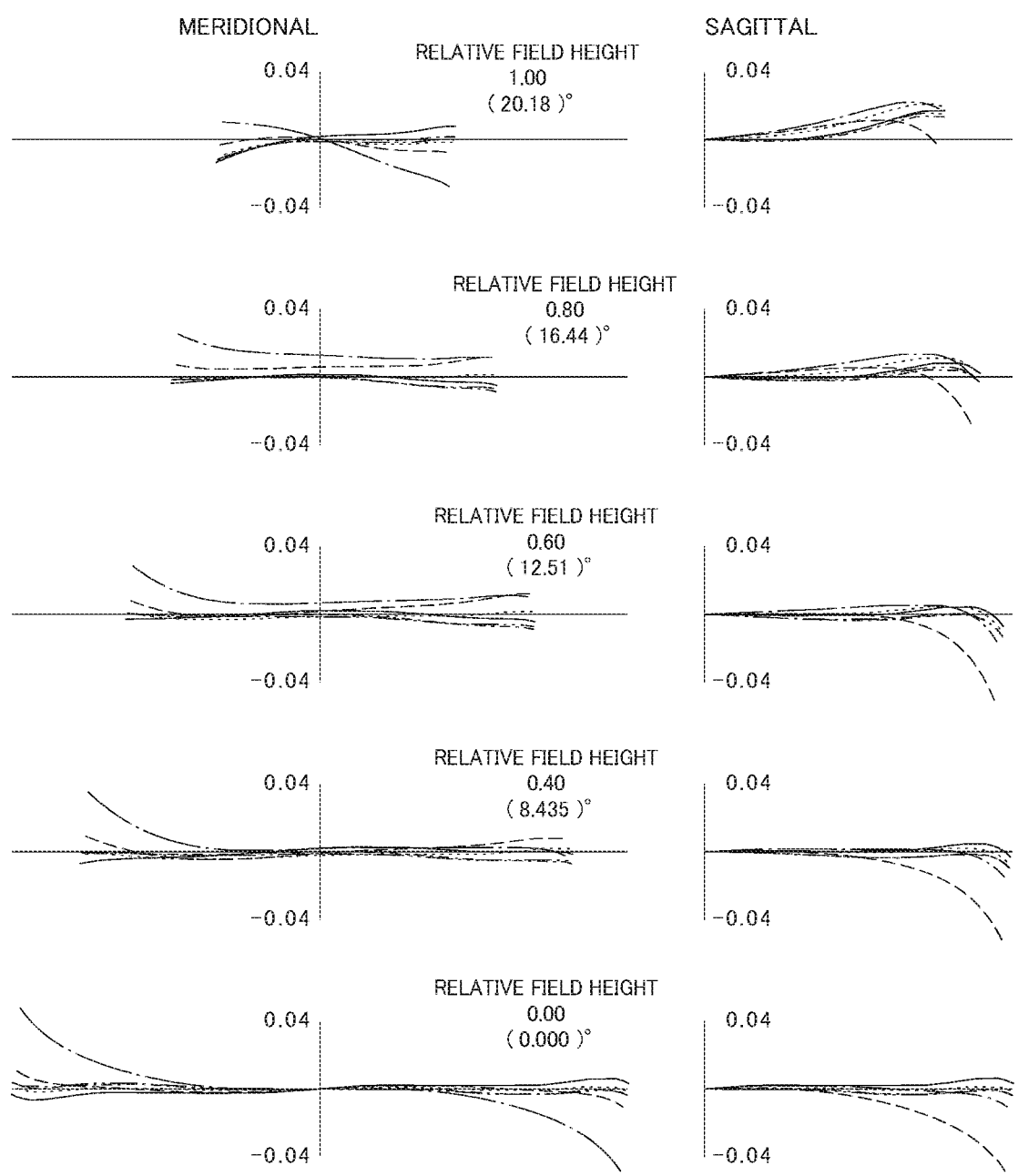
FIG. 15 depicts the transverse aberration at an intermediate distance of the lens system depicted in FIG. 9.
Figure 16:
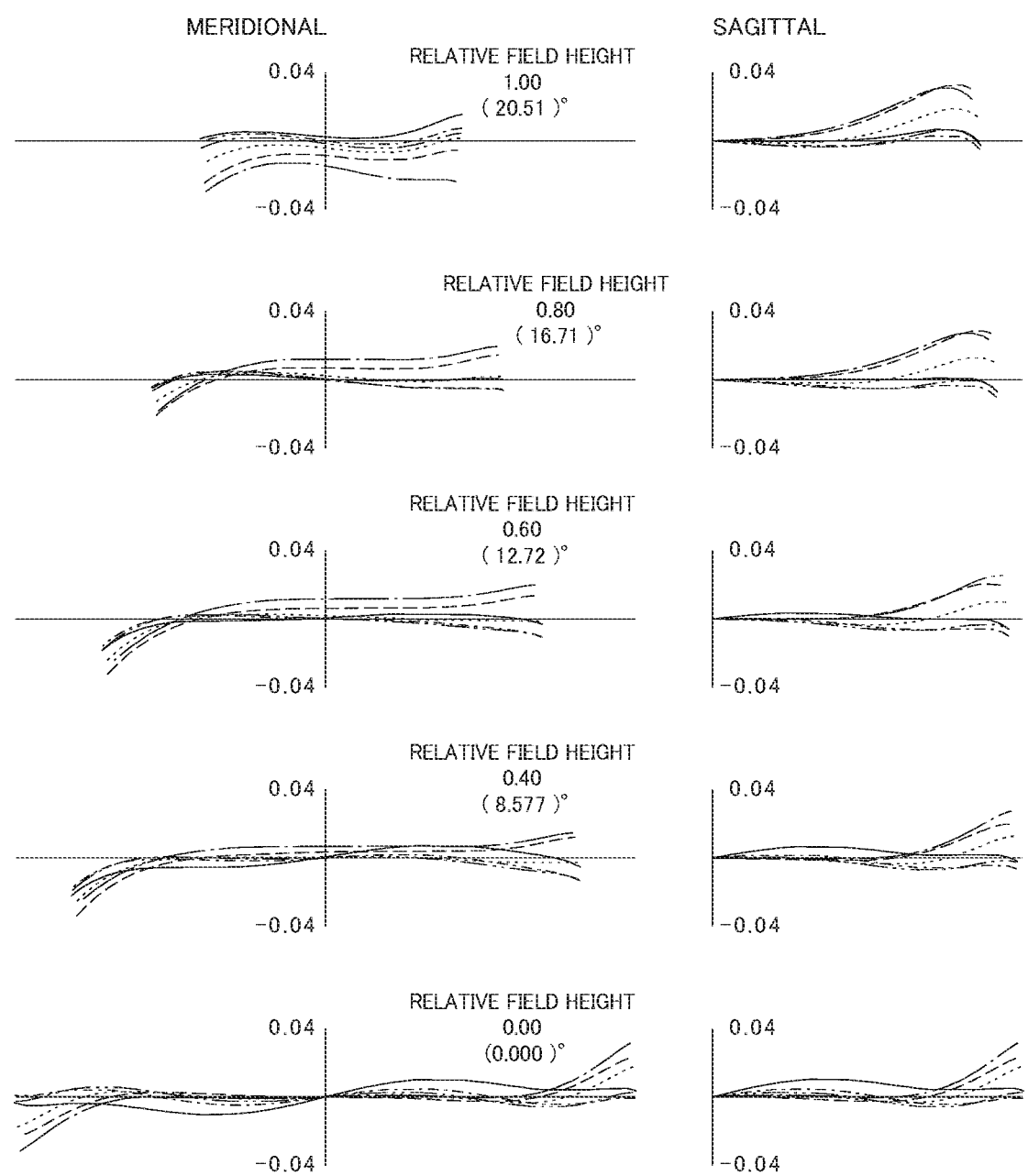
FIG. 16 depicts the transverse aberration at the nearest distance of the lens system depicted in FIG. 9.

FIG. 10 depicts data on each lens that constructs the lens system 10. FIG. 11 depicts coefficients of the aspherical surface included in the lens system 10. FIG. 12 depicts the focal length f, the F number (F No.), the angle of view, and the values of the variable intervals d9 and d12 of the lens system 10 when the focal length of the lens system 10 is at infinity, at an intermediate position (2280 mm), and at the nearest distance (shortest position, 230 mm). FIG. 13 depicts spherical aberration, astigmatism, and distortion when the focal length of the lens system 10 is at infinity (FIG. 13(a)), at an intermediate position (2280 mm) (FIG. 13(b)), and at the nearest distance (230 mm) (FIG. 13(c)). FIGS. 14 to 16 depict transverse aberration at infinity, at an intermediate position (2280 mm), and at the nearest distance (230 mm).

In this lens system 10, the approximate lens configurations and arrangement are the same as the lens system 10 depicted in FIG. 1. The values of the respective conditions of the lens system 10 depicted in FIG. 9 are as follows.

| | |
|---|---|
| (W1/W0):0.103(22.73/220.00) | Condition (1) |
| (W2/W0):0.211(46.35/220.00) | Condition (2) |
| (|R1/R2|):0.04 | Condition (3) |
| (|G4B1MH/G4B1Mr|(|D22/2/R22)):0.80 | Condition (4) |
| (vB42a/vB42b(v43/v44)):0.90 | Condition (5) |

The lens system 10 depicted in FIG. 9 satisfies all of Conditions (1) to (5), and is a lens system with an angle of view of around 20 degrees, making it a relatively wide-angle standard-type lens with a focal length of around 58 mm, and is extremely bright with an F number of 1.70. In addition, with the lens system 10, when focusing from infinity to the near distance, the F number is fixed, the angle of view hardly changes, and there is hardly any breathing or fluctuations in magnification. Accordingly, it is possible to easily perform focusing and obtain images that are sharp and have little fluctuation in brightness at the desired focal position. In addition, as depicted in FIGS. 13 to 16, it is possible to acquire images in which various aberrations are favorably corrected across the entire focusing range.

The invention claimed is:

1. A lens system for image pickup comprising, in order from an object side:
   a first lens group that has negative refractive power and is fixed during focusing;
   a second lens group that has positive refractive power and moves during focusing;
   a third lens group that has positive refractive power and is fixed during focusing; and
   a fourth lens group that has a stop disposed on the object side, is fixed during focusing, has positive refractive power, and is disposed closest to an image plane side,
   wherein the first lens group includes:
   a first lens with positive refractive power that is disposed closest to the object side;
   a first sub-lens group that has negative refractive power and includes the first lens and a lens with negative refractive power disposed closest to an image plane side; and
   a second sub-lens group that has negative refractive power and is disposed on the image plane side with a distance apart from the first sub-lens group; and a distance W0 along an optical axis from a surface that is closest to the object side in the first sub-lens group to an image forming plane, a distance W1 along the optical axis from the surface that is closest to the object side to a surface that is closest to the image plane side in the first sub-lens group, and a distance W2 along the optical axis from the surface that is closest to the object side in the first sub-lens group to a surface that is closest to the object side in the second sub-lens group satisfy following conditions:

$$0.05 < W1/W0 < 0.15$$

$$0.17 < W2/W0 < 0.29.$$

2. The lens system according to claim 1, wherein the first sub-lens group includes, in order from the object side, the first lens, a second lens that is a negative meniscus type and is convex on the object side, and a third lens that has negative refractive power and is concave on the object side.

3. The lens system according to claim 2, wherein the second lens and the third lens are low anomalous dispersion lenses.

4. The lens system according to claim 1, wherein the first lens group includes a final lens with negative refractive power disposed closest to the image plane side and is composed of one lens or a cemented lens.

5. The lens system according to claim 1, wherein the second lens group is composed of a meniscus-type lens that is concave on the object side.

6. The lens system according to claim 1, wherein the fourth lens group includes, in order from the object side, a first cemented lens composed of a lens with negative refractive power and a lens with positive refractive power and a second cemented lens composed of a lens with negative refractive power and a lens with positive refractive power.

7. The lens system according to claim 1, wherein the third lens group includes, from the object side, at least one lens with positive refractive power and a cemented lens that is disposed adjacent to the stop and is composed of a lens with positive refractive power and a lens with negative refractive power, and the fourth lens group includes, from the object side, a first cemented lens that is disposed adjacent to the stop and is composed of a lens with negative refractive power and a lens with positive refractive power, a second cemented lens composed of a lens with negative refractive power and a lens with positive refractive power, a lens with negative refractive power, and a lens with positive refractive power.

8. The lens system according to claim 7, wherein the at least one lens with positive refractive power in the third lens group includes two lenses with positive refractive power.

9. The lens system according to claim 1, wherein a radius of curvature R1 of a surface on the object side and a radius of curvature R2 of a surface on the image plane side of the first lens satisfy a following condition:

$$0 \leq |R1/R2| \leq 0.2.$$

10. An image pickup apparatus comprising: the lens system according to claim 1; and an image pickup element disposed on an image plane side of the lens system.

11. A lens system for image pickup comprising, in order from an object side:
a first lens group that has negative refractive power and is fixed during focusing;
a second lens group that has positive refractive power and moves during focusing;
a third lens group that has positive refractive power and is fixed during focusing; and
a fourth lens group that has a stop disposed on the object side, is fixed during focusing, has positive refractive power, and is disposed closest to an image plane side,
wherein the first lens group includes:
a first lens with positive refractive power that is disposed closest to the object side;
a first sub-lens group that has negative refractive power and includes the first lens and a lens with negative refractive power disposed closest to an image plane side; and
a second sub-lens group that has negative refractive power and is disposed on the image plane side with a distance apart from the first sub-lens group; and
the second sub-lens group includes a negative meniscus lens that is concave on the object side.

12. The lens system according to claim 11, wherein the negative meniscus lens of the second sub-lens group is a cemented lens and the cemented lens is a combination, from the object side, of a lens with negative refractive power and high anomalous dispersion and a lens with positive refractive power and low anomalous dispersion.

13. The lens system according to claim 11, wherein the first sub-lens group includes, in order from the object side, the first lens, a second lens that is a negative meniscus type and is convex on the object side, and a third lens that has negative refractive power and is concave on the object side.

14. The lens system according to claim 13, wherein the second lens and the third lens are low anomalous dispersion lenses.

15. An image pickup apparatus comprising:
the lens system according to claim 11; and
an image pickup element disposed on an image plane side of the lens system.

16. A lens system for image pickup comprising, in order from an object side:
a first lens group that has negative refractive power and is fixed during focusing;
a second lens group that has positive refractive power and moves during focusing;
a third lens group that has positive refractive power and is fixed during focusing; and
a fourth lens group that has a stop disposed on the object side, is fixed during focusing, has positive refractive power, and is disposed closest to an image plane side,
wherein the first lens group includes a first lens with positive refractive power that is disposed closest to the object side, and
the second lens group is composed of a cemented lens composed, from the object side, of a lens with negative refractive power and a lens with positive refractive power, and
the lens with positive refractive power in the cemented lens being a low anomalous dispersion lens.

17. The lens system according to claim 16, wherein the lens with negative refractive power in the first cemented lens in the fourth lens group is a lens with high anomalous dispersion and the lens with the positive refractive power is a low dispersion lens.

18. The lens system according to claim 16,
wherein the lens with negative refractive power in the second cemented lens in the fourth lens group is a high dispersion lens and the lens with positive refractive power is a low dispersion lens, and an Abbe number vB42a of the lens with negative refractive power and an Abbe number vB42b of the lens with positive refractive power satisfy a following condition:

$0.70 \leq vB42a/vB42b \leq 1.45$.

19. The lens system according claim 16,
wherein an effective radius G4B1MH and a radius of curvature G4B1Mr of a cemented surface of the first cemented lens in the fourth lens group satisfy a following condition:

$0.65 < |G4B1MH/G4B1Mr| \leq 0.85$.

20. An image pickup apparatus comprising:
the lens system according to claim 16; and
an image pickup element disposed on an image plane side of the lens system.

* * * * *